H. C. JACOT.
Pendulum-Regulator for Clocks.
No. 198,390. Patented Dec. 18, 1877.
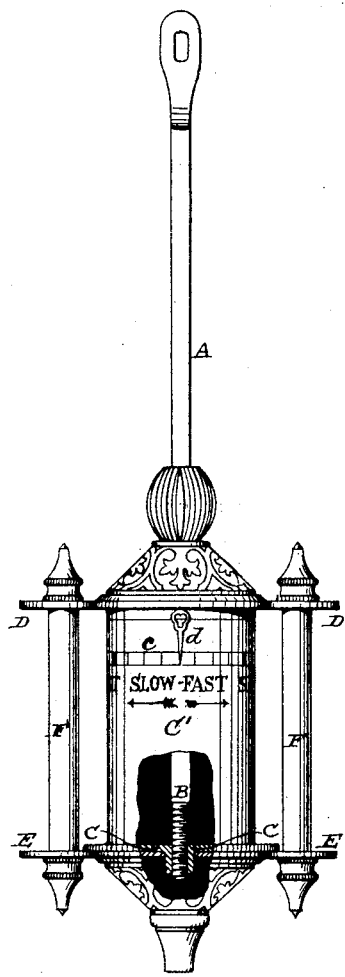
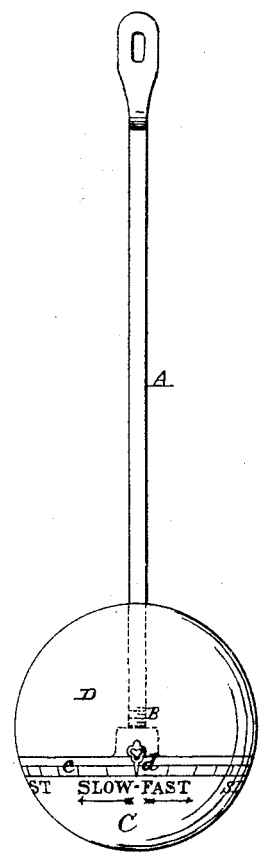

UNITED STATES PATENT OFFICE.

HENRY C. JACOT, OF ST. LOUIS, MISSOURI.

IMPROVEMENT IN PENDULUM-REGULATORS FOR CLOCKS.

Specification forming part of Letters Patent No. 198,390, dated December 18, 1877; application filed November 19, 1877.

*To all whom it may concern:*

Be it known that I, HENRY C. JACOT, of the city of St. Louis, in the State of Missouri, have invented a certain new and useful Improvement in Pendulum-Regulators, of which the following is a full, clear, and exact description, reference being had to the accompanying drawings, making part of this specification.

My improvement consists in a nut screwing upon the pendulum-rod, and having marked upon it a scale, which turns beneath a pointer or finger attached to that part of the weight of the pendulum which cannot be turned on the rod.

The scale on the nut is preferably so proportioned to the pitch of the screw that the divisions of the scale shall indicate the distance the nut should be turned to regulate the clock for any given inaccuracy in running.

In the drawings, Figure 1 is a front view with part broken away, and showing my improvement as applied to a pendulum made to represent the compensation-pendulum, (which has a barrel containing mercury, that expands upward with heat in the barrel,) to compensate for the lengthening of the rod, so as to keep the center of gravity at an equal distance from the point of oscillation at all temperatures. Fig. 2 represents the improvement as applied to a globular weight.

A is the pendulum-rod, which has an angular portion passing through the weight, and a screw-threaded lower end, B, on which screws the nut C, which nut forms the supporting element of the weight.

In Fig. 1 the rod A passes through two cross-pieces, D and E, held together by side screw-bolts F upon a cylinder, C', which is attached to the nut C, so as to turn therewith and form part thereof.

The cylinder C' has a circumferential scale, c, which turns beneath a pointer or finger, d, projecting downward from the cross-piece D.

The scale is preferably so divided in proportion to the pitch of the screw B that each division of the scale shall indicate the distance the nut should be turned to rectify any given irregularity of time in running. For instance, the divisions might stand for the loss or gain of one minute per day, and per week, so that there would be no difficulty in regulating the clock if the amount of irregularity is known.

In the modification shown in Fig. 2 the pointer d projects from the fixed part D of the weight, and the scale is marked on the nut or turning part C, as in Fig. 1.

As another obvious modification, the scale might be upon the fixed part D, and the pointer on the turning part C; but this would evidently be a less perfect construction, because the pointer, in turning, would pass out of sight.

Beneath the scale c should be marked the words "Slow" and "Fast," with an arrow beneath each of these words, indicating the direction to turn the nut to cause the clock to go faster or slower.

It is obvious that the form of the pendulum-weight might vary considerably. I have shown two forms, but do not confine myself to these.

What I claim as new and of my invention is—

The combination, in a pendulum-weight, of the nut C, screwing on the rod, and part D, sliding on the rod A, and provided, respectively, with scale and pointer, substantially as set forth.

HENRY C. JACOT.

In presence of—
SAML. KNIGHT,
GEO. H. KNIGHT.